(12) United States Patent
Shaw et al.

(10) Patent No.: US 10,068,071 B2
(45) Date of Patent: Sep. 4, 2018

(54) SCREEN SHOT MARKING AND IDENTIFICATION FOR DEVICE SECURITY

(71) Applicant: AirWatch LLC, Atlanta, GA (US)

(72) Inventors: David Shaw, Buford, GA (US);
Karishma Babu, Atlanta, GA (US);
Evan Hurst, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 204 days.

(21) Appl. No.: 14/848,805

(22) Filed: Sep. 9, 2015

(65) Prior Publication Data

US 2017/0068829 A1    Mar. 9, 2017

(51) Int. Cl.
*G06F 21/16* (2013.01)
*G06F 21/62* (2013.01)
*H04N 1/32* (2006.01)

(52) U.S. Cl.
CPC .......... *G06F 21/16* (2013.01); *G06F 21/6281* (2013.01); *H04N 1/32144* (2013.01)

(58) Field of Classification Search
CPC ............................ G06F 21/16; H04N 1/32144
See application file for complete search history.

(56) References Cited

U.S. PATENT DOCUMENTS

| | | | | |
|---|---|---|---|---|
| 8,429,745 B1* | 4/2013 | Casaburi | ............... | G06F 21/554 726/1 |
| 8,655,011 B2* | 2/2014 | Hannigan | ............ | G06Q 10/087 382/100 |
| 8,826,452 B1* | 9/2014 | He | .......................... | G06F 21/84 726/27 |
| 8,844,059 B1* | 9/2014 | Manmohan | ........... | G06F 21/554 726/26 |
| 9,582,482 B1* | 2/2017 | Sharifi | .................. | G06F 17/278 |
| 2003/0012401 A1* | 1/2003 | Sharma | ................. | G06T 1/0064 382/100 |
| 2004/0247120 A1* | 12/2004 | Yu | ......................... | H04N 5/913 380/202 |
| 2011/0214107 A1* | 9/2011 | Barmeir | ............. | G06F 11/3684 717/125 |
| 2011/0314550 A1* | 12/2011 | Mastrangelo | ......... | G06T 1/0021 726/26 |
| 2012/0169762 A1* | 7/2012 | Kocjan | ............... | G06F 21/6209 345/619 |

(Continued)

OTHER PUBLICATIONS

Piec, Maciej; Rauber, Andreas; "Real-time screen watermarking using overlaying layer", Ninth International Conference on Availability, Reliability and Security (ARES), IEEE, Sep. 8-12, 2014, pp. 561-570.*

*Primary Examiner* — Victor Lesniewski
(74) *Attorney, Agent, or Firm* — Thomas | Horstemeyer, LLP

(57) ABSTRACT

Disclosed are examples of marking screenshots and identifying screenshots that have been marked. A client application or a computing environment can generate a watermark template for encoding in a user interface of the client application where the watermark template is not visible to the user of a client device. If a screen capture event is performed on the client device where a digital image file of a screenshot is generated, the digital image file can be analyzed to identify the presence of the watermark template. If the watermark template is identified, a remedial action can be performed in association with the screenshot.

20 Claims, 8 Drawing Sheets

(56) References Cited

U.S. PATENT DOCUMENTS

| | | | |
|---|---|---|---|
| 2012/0174232 A1* | 7/2012 | Dharawat | G06F 21/645 726/26 |
| 2012/0255029 A1* | 10/2012 | Kim | G06F 21/10 726/26 |
| 2014/0007246 A1* | 1/2014 | Nelson | H04L 63/12 726/26 |
| 2014/0150114 A1* | 5/2014 | Sinha | H04W 12/00 726/28 |
| 2014/0169616 A1* | 6/2014 | Homme | G06T 1/0021 382/100 |
| 2014/0247961 A1* | 9/2014 | Kim | H04N 21/8358 382/100 |
| 2015/0215492 A1* | 7/2015 | De Vuono | H04N 1/32144 382/100 |
| 2016/0171242 A1* | 6/2016 | Basavapatna | H04L 51/12 726/27 |
| 2016/0253772 A1* | 9/2016 | Kofod | G06F 21/16 382/100 |
| 2016/0285893 A1* | 9/2016 | Childress | H04L 63/0428 |
| 2017/0017648 A1* | 1/2017 | Pearlman | G06K 9/46 |

\* cited by examiner

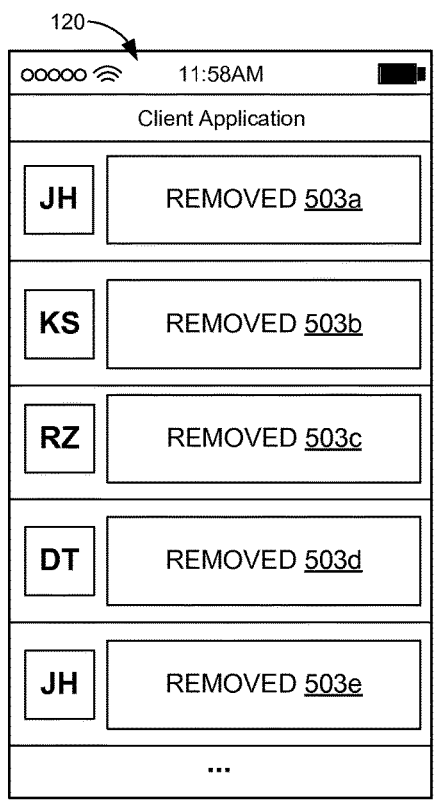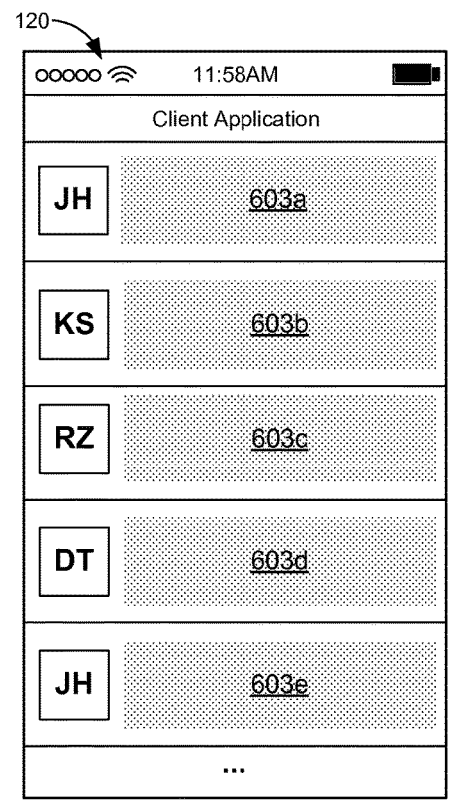
FIG. 5  FIG. 6

SCREEN SHOT MARKING AND IDENTIFICATION FOR DEVICE SECURITY

BACKGROUND

To reduce the costs associated with providing employees or members of an organization with mobile devices, such as smartphones, tablets, or laptop computers, a business or other organization may implement bring-your-own-device (BYOD) policies that allow employees to use their personal devices to access business resources. For an organization to oversee BYOD policies on user devices, the organization can require an individual employee to have certain applications installed on his or her device. These applications can include mobile device management (MDM)-related applications.

Some of the BYOD devices have an ability to allow a user to capture a screenshot—a static image capture of visual content being rendered in a display of a client device. Screenshots can include sensitive or proprietary content. As BYOD devices can come from a multitude of different manufacturers and can come preloaded with various operating systems and default configurations, restricting access to hardware or software features that allow users to perform screenshots remains problematic.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 4-6 show examples of screenshots that are modified in response to an identification of sensitive or propriety content.

DETAILED DESCRIPTION

The present disclosure relates to marking screenshots and identifying screenshots that have been marked. As noted above, some devices have an ability to allow a user to capture a screenshot which is a static image capture of visual content being rendered in a display of a client device. Screenshots can include sensitive or proprietary content. For example, screenshots can include sensitive or proprietary enterprise data. As BYOD devices can come from a multitude of different manufacturers and can come preloaded with various operating systems and default configurations, restricting access to hardware or software features that allow users to perform screenshots remains problematic. In other words, few mechanisms exist to prevent screenshots without interfering with the performance of the device.

For example, a device provided by a manufacturer can have an ability to capture a screenshot by holding a physical button located on the device. By disabling the button programmatically, the operation of the device would be impaired because the physical button could be used to turn on or off a display screen or access a home screen.

Accordingly, a client application executable on a client device can detect screen capture events being performed on a client device where a screenshot is generated. The screenshot can include a digital image of the content being shown on a display of the client device when the screen capture event was performed. The client application can then analyze the digital image or communicate the digital image to a remote computing environment for analysis. The client application or the remote computing environment can then determine whether the screenshot includes visual content presented by a particular client application, such as an enterprise email application or an enterprise document management application.

If a digital image generated by a screen capture event includes visual content presented by the particular client application, the computing environment or the client application can perform a remedial action, such as blurring or obfuscating potentially sensitive regions of the digital image such that the sensitive regions are illegible, deleting the digital image from local memory of the client device, communicating a notification to an administrator, overlaying a watermark on the digital image, or replacing content in the digital image with predefined content that indicates that the digital image has been modified.

The client application can encode a watermark pattern in a user interface for rendering on a display. In some examples, the computing environment can generate the watermark pattern so that it is unperceivable to a user of the client device. However, a client application or a computing environment can detect the watermark from screenshots to determine whether the content in the screenshots was presented by or at the request of a particular client application.

Figure 1:
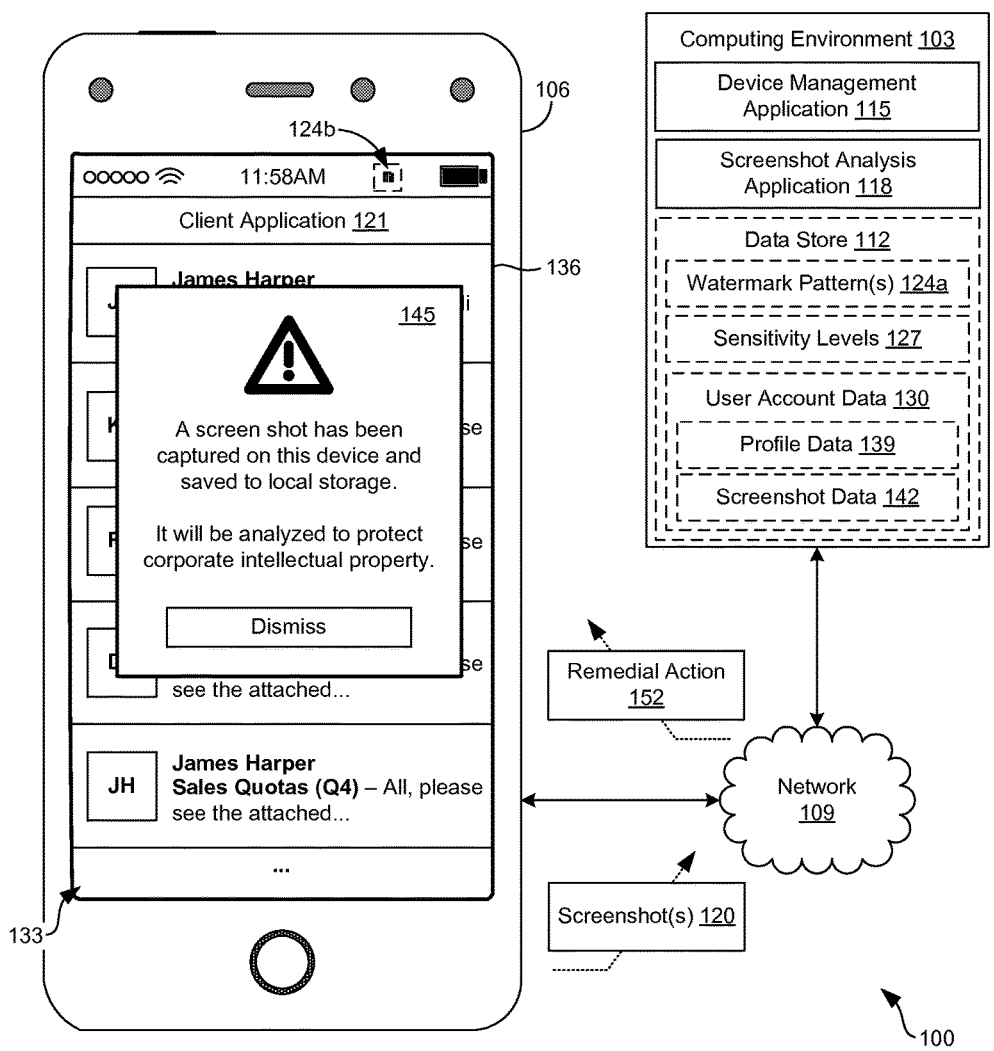
FIG. 1 is a drawing of an example of a client device executing a client application in a networked environment.

With reference to FIG. 1, shown is an example of a networked environment 100. The networked environment 100 can include a computing environment 103 and a client device 106 in communication with one another over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, or telephony networks.

The computing environment 103 can include, for example, a server computer or any other system providing computing capability. Alternatively, the computing environment 103 can include a plurality of computing devices that are arranged, for example, in one or more server banks or computer banks. The computing environments 103 can include a grid computing resource or any other distributed computing arrangement. The computing devices can be located in a single installation or can be distributed among many different geographical locations. The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above.

A data store 112 can include memory of the computing environment 103 or mass storage resources of the computing environment 103. The data stored in the data store 112, for example, can be associated with the operation of the various applications and functional entities described below.

The components executed on the computing environment 103 can include, for example, a device management application 115 and a screenshot analysis application 118. The device management application 115 can serve up information to generate network pages or user interface screens in a client application 121. In some examples, the device management application 115 can provide enterprise information, such as emails, documents, and spreadsheets, to the client device 106 if the client device 106 is enrolled with the device management application 115.

The screenshot analysis application 118 can perform remote analysis of screenshots 120 generated on the client device 106. In some examples, the screenshot analysis application 118 can detect watermarks that are indicative of particular user interface screens of particular client applications 121 that generated a screenshot 120. For example, the screenshot analysis application 118 can determine whether a watermark identified in a screenshot 120 indicates that the screenshot 120 captured information presented by an enterprise email application. In another example, the screenshot analysis application 118 can determine whether a watermark identified in a screenshot 120 indicates that the screenshot 120 captured information presented by an enterprise document management application. While the screenshot analysis application 118 is shown as being a component of the computing environment 103, in some examples, the client application 121 or another service executing on the client device 106 can perform similar functionality.

Different types of watermarks can also be used to convey different sensitivity levels 127 for the displayed content. For example, a watermark generated for display in a respective user interface can be generated based on an anticipated sensitivity level 127 of the content in the user interface. In one example, when a user selects or accesses an email with a "CONFIDENTIAL" tag in the subject line (e.g., for an email inbox), a subsequent user interface can be rendered that includes the body of the email as well as a watermark that indicates that the user interface 133 contains confidential content. In other words, the watermark conveys a high sensitivity level 127 based on the content being rendered in the respective user interface 133. For user interfaces 133 that include non-confidential or non-proprietary content, a watermark that conveys a lower sensitivity level 127 can be generated for rendering.

Further, in some examples, the screenshot analysis application 118 can identify sensitive content in screenshots 120. For example, the screenshot analysis application 118 can perform an optical character recognition (OCR) to identify text in the screenshot 120. Using the text, the device management application 115 can determine whether the text includes potentially sensitive or propriety information. For example, if the word "confidential" appears in a body of an email captured in a screenshot 120, the device management application 115 can determine that the screenshot 120 includes potentially sensitive content.

In other examples, the screenshot analysis application 118 can utilize fingerprint matching or Radon transformations to identify whether symbols or images (beyond text) include potentially sensitive or proprietary information. For example, a word processing document can include chemical formulae that are propriety to an enterprise. The screenshot analysis application 118 can detect the presence of the chemical formulae by comparing the region of the screenshot 120 having the chemical formulae to predefined image data. Assuming a match is found, the device management application 115 can determine whether the screenshot 120 includes potentially sensitive content.

The data stored in the data store 112 can include, for example, watermark patterns 124a . . . 124b, sensitivity levels 127, and user account data 130. The watermark patterns 124 can include predefined pixel settings and arrangements of pixel settings that are capable of identification by the screenshot analysis application 118. In one example, the client application 121 renders a particular one of the watermark patterns 124 in a user interface 133 shown on a display 136 of the client device 106. If a screenshot 120 is captured of the user interface 133, the watermark pattern 124 identified from the screenshot 120 can be indicative of the user interface 133 or the client application 121 rendering the user interface 133.

In some examples, the watermark patterns 124 include an arrangement of one or more pixels in the user interface 133 that are modified to have a predefined red, green, blue, or alpha (transparency) value. In some examples, the computing environment 103 can generate the watermark patterns 124 for inclusion in the user interface 133 while being imperceptible to the human eye. For example, the computing environment can access a blue background image to be used as a header bar in a user interface 133. The computing environment 103 can slightly alter pixel values, such as red, green, blue, or alpha values, for an arrangement of pixels in the header bar such that a user of the client device 106 would be incapable of visually detecting the presence of a watermark pattern 124. For example, the computing environment 103 can adjust the blue pixel values for pixels in the arrangement to slightly adjust the "blueness" of the pixels. The slight adjustment would not be noticed by a user; however, the computing environment 103 could later identify the pixels in the arrangement after a screenshot 120 has been generated.

The sensitivity levels 127 can indicate a sensitivity of particular user interface screens, client applications 121, predefined text, or predefined images. In one example, a client application 121 can include an email application where a user can send and receive enterprise emails. A "help" screen, or a user interface screen that assists the user with how to use the email application, can have a lower sensitivity level 127 than a user interface screen that includes content of a confidential email. In another example, the computing environment 103 can associate text regions identified in a screenshot that use the term "important" with a lower sensitivity level 127 than text regions that include the terms "confidential" or "proprietary."

The user account data 130 can include, for example, profile data 139 and screenshot data 142 stored in association with a user account, a user group, or an organization, such as an enterprise. Profile data 139 can include information associated with the user, such as a first name, a middle name, a last name, an email address, a username, a password, a personal identification number (PIN), or authentication data. In some examples, profile data 139 can include an authorized sensitivity level 127. If content identified in a screenshot 120 exceeds the authorized sensitivity level 127, the computing environment 103 or the client application can delete or sensor the screenshot 120; notify an administrator; or perform another suitable remedial action 152.

The client device 106 can be representative of one or more client devices 106 that execute instances of the client application 121. The client device 106 can include a processor-based system, such as a computer system, that can include a desktop computer, a laptop computer, a personal digital assistant, a cellular telephone, a smartphone, a set-top box, a music player, a tablet computer system, a game console, or an electronic book reader. The client device 106 can include a display 136 that can be a liquid crystal display (LCD) or light emitting diode (LED) display. The client device 106 can also be equipped with network interfaces, including a localized network interface, such as a near-field communication (NFC) interface or radio-frequency identification (RFID) interface.

The client device 106 can execute various applications, such as the client application 121. The client application 121 can access network content served up by the computing environment 103 or other servers. The client application 121 can also render a user interface 133 on the display 136. To this end, the client application 121 can include a dedicated client application or a browser, and the user interface 133 can include an application screen, a network page, or other interface. The client device 106 can execute applications beyond the client application 121 such as device management applications, enterprise applications, social networking applications, word processors, spreadsheet applications, or media viewing applications.

Next, a general description of the operation of the various components of the networked environment 100 is provided. To begin, the client device 106 can install and execute an instance of a client application 121 or other service configured to detect screenshot capture events as they are performed in the client device 106. In one example, the client application 121 monitors a file directory of the client device 106 where snapshots are traditionally stored to identify the presence of new digital images, indicating that a screen capture event has been performed. In another example, the client application 121 monitors user gestures or other interactions performed in association with the hardware or software components of the client device 106. For instance, some client devices 106 are configured to perform a screen capture event as the user swipes his or her palm across the display 136. The client application 121 can detect the swipe gesture performed on the display, indicating that a screen capture event has been performed.

In the example of FIG. 1, the client application 121 includes an email application that permits a user to send, receive, and read emails. The email application can include various user interface screens, for example, to view an inbox, read a selected email, or perform another function. In one example, the computing environment 103 can generate a unique watermark pattern 124 for each of the user interfaces 133 and store the unique watermark pattern 124 in the data store 112. The client application 121 can remotely access the generated watermark pattern 124 for rendering on the display 136. When a watermark pattern 124 is detected in a screenshot 120, the computing environment 103 can cross-reference the watermark pattern 124 against a library of watermark patterns 124 stored in the data store 112 to identify the particular user interface screen being shown on the display 136 when the screen capture event was performed.

In another example, the computing environment 103 can generate a unique watermark pattern 124 for individual client applications 121 that are capable of execution on the client device 106. If a watermark pattern 124 is detected in a screenshot 120, the computing environment 103 can cross-reference the watermark pattern 124 against the watermark patterns 124 stored in the data store 112 to identify the client application 121 being shown on the display 136 when the screen capture event was performed.

Depending on the user interface screen to be shown on the display 136 at a given time, the client application 121 can access a corresponding watermark pattern 124 from the data store 112 to encode in the user interface 133. In some examples, the watermark patterns 124 are included in the user interface 133 while being imperceptible to the human eye. For example, the client application 121 or the computing environment can alter an arrangement of pixels in a header bar to slightly modify the color values of the pixels in an arrangement such that a user of the client device 106 would be incapable of visually detecting the presence of the watermark pattern 124 when looking at the user interface 133. In another example, the client application 121 or the computing environment 103 can slightly alter an arrangement of pixels in the user interface 133 to modify the alpha value of the pixels in an arrangement such that a user of the client device 106 would be incapable of visually detecting the presence of a watermark pattern 124.

Assuming a screenshot capture event has been detected, the user interface 133 can present a dialog 145 that indicates that a screen capture event has been performed, and the screenshot 120 that resulted from the screen capture event will be analyzed. In one example, the client application 121 locally analyzes the screenshot 120 generated during the screen capture event. In another example, the client device 106 communicates the screenshot 120 over the network 109 as screenshot data 142 for remote analysis by the computing environment 103.

The client application 121 or the computing environment 103 can analyze the digital image to determine whether content shown in the digital image includes information that is sensitive or proprietary. For example, an administrator can associate subject lines of the emails shown in the email application of FIG. 1 with a low level of sensitivity or a high level of sensitivity by creating sensitivity levels 127. Assuming the subject lines of the emails have a high level of sensitivity, and the user who performed the screenshot 120 does not have suitable permissions to perform screenshots 120 of highly sensitive materials, the computing environment 103 can identify a remedial action 152 and communicate the remedial action 152 to the client device 106 for local performance.

In some embodiments, the remedial action 152 can include blurring or obfuscating potentially sensitive portions of the digital image, deleting the digital image from local memory of the client device, communicating a notification to an administrator indicating that a screenshot 120 was performed, overlaying a watermark on the generated digital image, or replacing content in the digital image with predefined content that indicates that the digital image has been modified.

Figure 2:
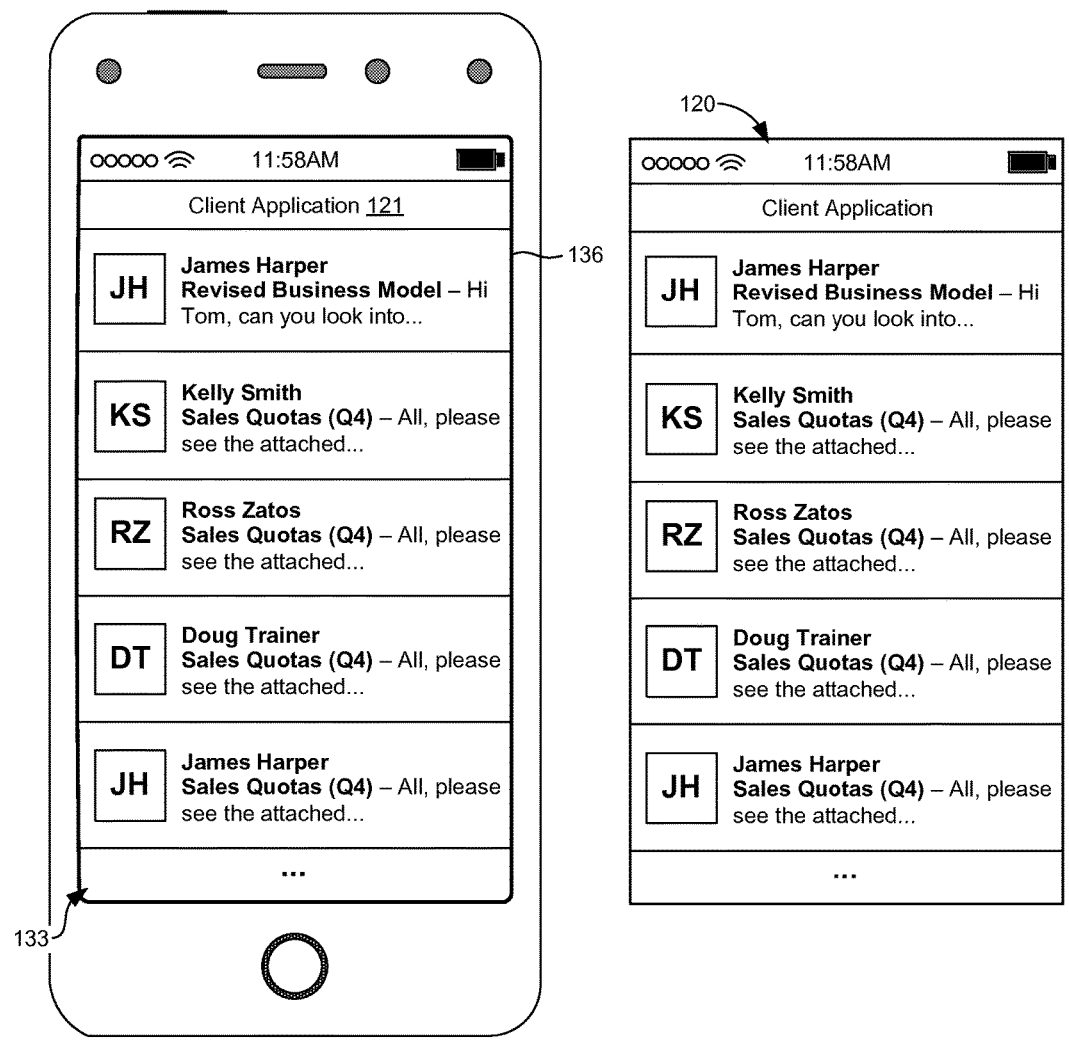
FIG. 2 is a drawing of the client device of FIG. 1 and a screenshot showing content in a display of the client device.

Turning now to FIG. 2, shown is an example of a user interface 133 of a client application 121 rendered on a display 136 of a client device 106. In the example of FIG. 2, a screenshot 120 of the user interface 133 rendered in the display 136 of the client device 106 is generated. In various embodiments, the screenshot 120 includes an image file, such as a Joint Photographic Experts Group (JPEG) file, a portable networks graphic (PNG) file, a graphics interchange format (GIF) file, a tagged image format file (TIFF), portable document format (PDF) file, or other image file type.

In various embodiments, the operating system of the client device 106 facilitates the storage of the screenshot 120 in local memory of the client device 106 or in remote memory where the screenshot 120 is communicated over the network 109 for remote storage. In some examples, the operating system can store the screenshot 120 in a predefined file directory according to a file naming format. For example, the screenshot 120 can be stored as "user_name/screenshots/screenshot201502151600.png," where "user_name" is the user name of an account associated with the client device, "screenshots," is a directory name, and "screenshot201502151600" is the digital image file of the screenshot 120. The format of the file name of the digital image file can be indicative of a time the screenshot 120 was captured. For example, "201502151600" can indicate that the screenshot 120 was captured on Feb. 15, 2015 at 4:00 PM. The client application 121 can monitor the file directory to detect the presence of new screenshots 120.

Figure 3:
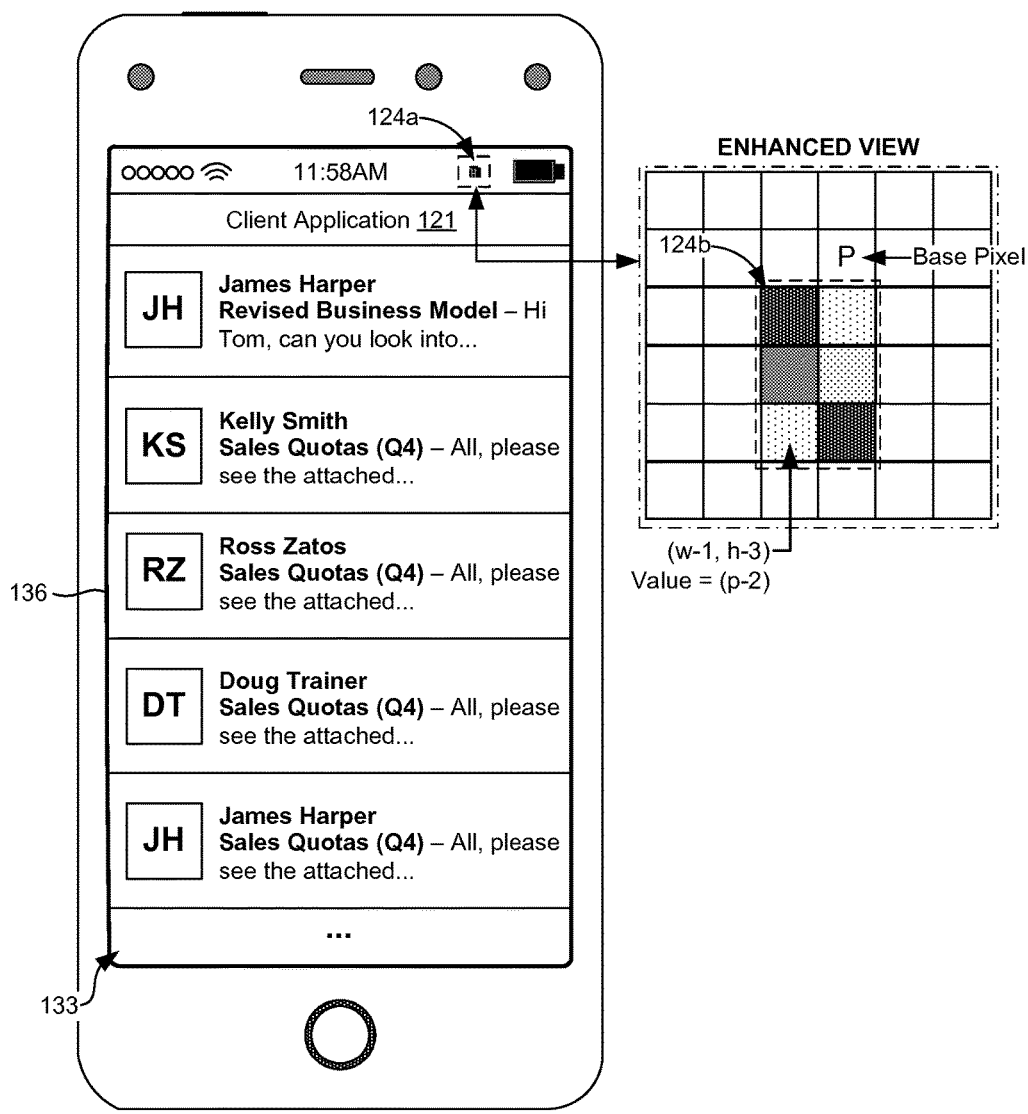
FIG. 3 is a drawing of the client device of FIG. 1 and a screenshot having an identifiable watermark pattern.

Referring next to FIG. 3, shown is another example of a user interface 133 of a client application 121 rendered on a display 136 of a client device 106. In the example of FIG. 3, the client application 121 causes a watermark pattern 124a . . . 124b to be shown on the display 136 of the client device. In one example, a watermark pattern 124 can include a digital image file, such as a JPEG, PNG, GIF, TIFF, or PDF file, that is overlaid in a particular area of the user interface 133.

In some examples, the client device 106 generates a screenshot 120 using a compression technique. For example, if the screenshot 120 is saved as a JPEG file, the screenshot 120 could have been compressed. Accordingly, the computing environment 103 generates the watermark pattern 124 such that a compression applied to a digital image during storage of the screenshot 120 does not impair a later detection of the watermark pattern 124. Similarly, the client application 121 encodes the watermark pattern 124 in an area of the user interface 133 such that a compression applied to the digital image during storage of the screenshot 120 does not impair the later detection of the watermark pattern 124.

In other examples, the client device 106 can store the digital image using "lossless" compression where a screenshot 120 of what is shown in the user interface 133 of the client device 106 can be perfectly reconstructed from compressed data. For instance, the client device 106 can employ lossless compression to save the screenshot 120 as a PNG file. Accordingly, the client application 121 or the computing environment 103 can later identify the watermark pattern 124 despite compression.

The watermark pattern 124 shown on the display 136 can include a predefined arrangement of pixels that are capable of identification by the screenshot analysis application 118. In the example of FIG. 3, the shaded pixels shown in the watermark pattern 124 can represent pixels that have a red, green, blue, or alpha value different from surrounding pixels while still being imperceptible to the human eye.

The example of FIG. 3 shows an enhanced view of the user interface 133 where the watermark pattern 124 is shown as a 2×3 grid of pixels having values (e.g., red, green, blue, or alpha values) different from surrounding pixels. The base pixel is denoted as "P" for explanatory purposes. The 2×3 grid of pixels in the example watermark pattern 124 of FIG. 3 can be described as:

(w−1, h−1) (w, h−1)
(w−1, h−2) (w, h−2)
(w−1, h−3) (w, h−3)

where "(w−1, h−3)" is a pixel to the left of the base pixel and down 3 pixels, and so forth. The values of each of the adjusted pixels can be described as:

(p+2) (p−2)
(p+1) (p−1)
(p−2) (p+2)

where "p" is a value of the base pixel (e.g., a red, green, blue, or alpha value) and (p+1) is an incremented value of the pixel expressed by, for example, red+1, green+1, blue+1, or alpha+1. The pixel values can also be set to predefined values, since altering the color of isolated pixels would be undetectable to a user.

The screenshot analysis application 118 can identify a predefined base pixel in the screenshot 120 and analyze the pixels surrounding the base pixel according to the specified watermark pattern 124. The screenshot analysis application 118 can detect a match if the values of the pixels match the watermark pattern 124. The match can identify the particular client application 121 being shown on the display 136 when the screenshot 120 was captured as well as the particular user interface screen being shown by the client application 121.

As the value of a pixel in the watermark pattern 124 is an offset from a base pixel, a modification of the color palette of the screenshot 120, such as converting the screenshot 120 to greyscale, colorblind mode, or high contrast, would not prevent detection of the watermark pattern 124.

Figure 4:
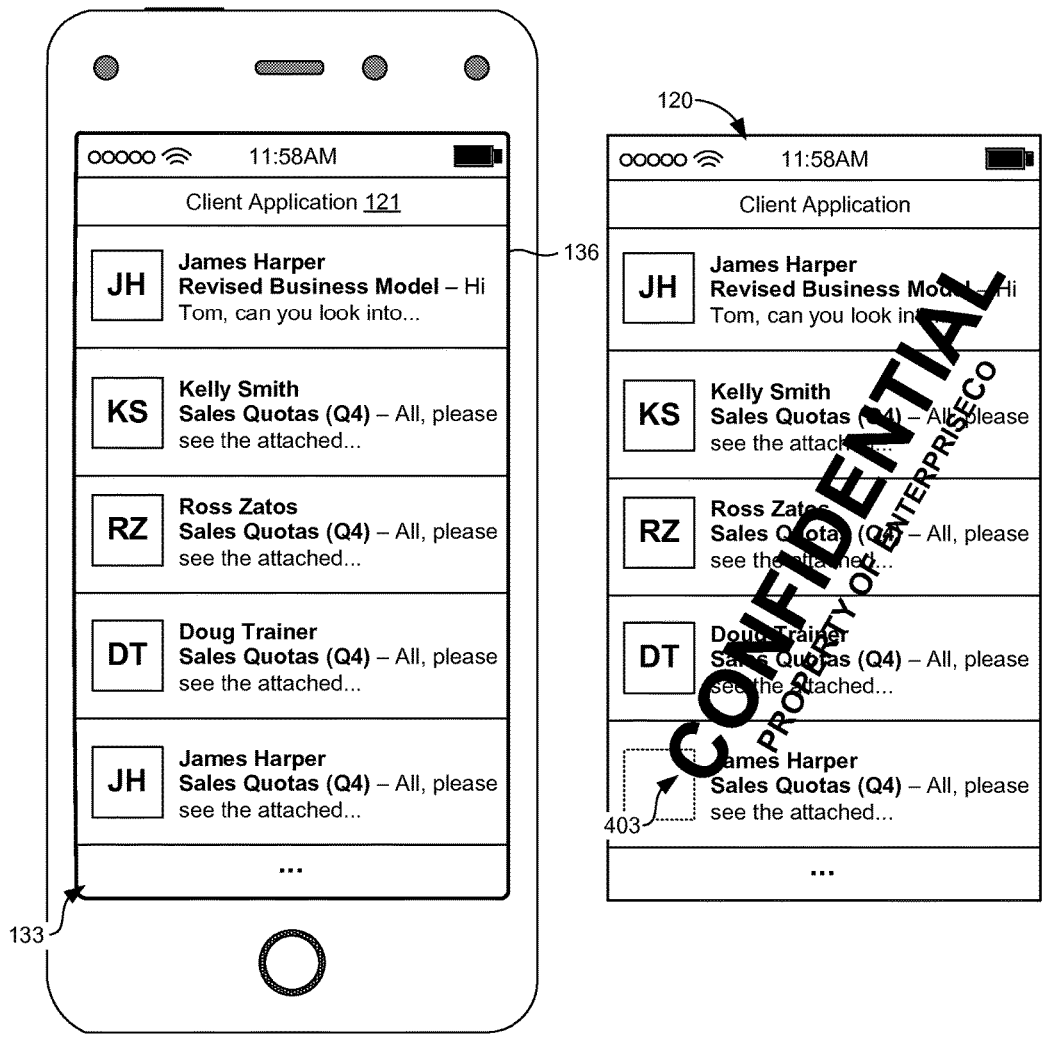

Moving on to FIG. 4, shown is an example of a user interface 133 of a client application 121 rendered on a display 136 of a client device 106. In the example of FIG. 4, the digital image of the screenshot 120 is modified to apply a branding 403 marked "CONFIDENTIAL—PROPERTY OF ENTERPRISECO." The client application 121 or the computing environment 103 can apply the branding 403 as a remedial action 152 in response to the screenshot analysis application 118 identifying potentially sensitive or proprietary information in the screenshot 120. The client application 121 can modify the screenshot 120 to include the branding 403 or, in some examples, the client application 121 can communicate the screenshot 120 to the computing environment 103 for modification. The client application 121 or the computing environment 103 can replace a modified version of the screenshot 120 with the original screenshot 120 in local memory of the client device 106.

In addition to applying the label to the screenshot 120, the client application 121 or the computing environment 103 can perform other remedial actions 152. For example, in FIG. 5, the client application 121 or the computing environment 103 can modify a screenshot 120 to include labels 503a . . . 503e branded "REMOVED." In the example of FIG. 5, the screenshot analysis application 118 can identify regions of the screenshot 120 that include text to obfuscate later reading of the text. The client application 121 or the computing environment 103 can replace the regions with the labels 503 to protect sensitive information from being disseminated through the screenshot 120. In some examples, the client application 121 or the computing environment 103 can identify regions of text utilizing OCR. In the example of FIG. 6, the client application 121 or the computing environment 103 can modify a screenshot 120 to apply blurry regions 603a . . . 603e to regions of the screenshot 120 that include text or other sensitive or proprietary content.

Figure 7:
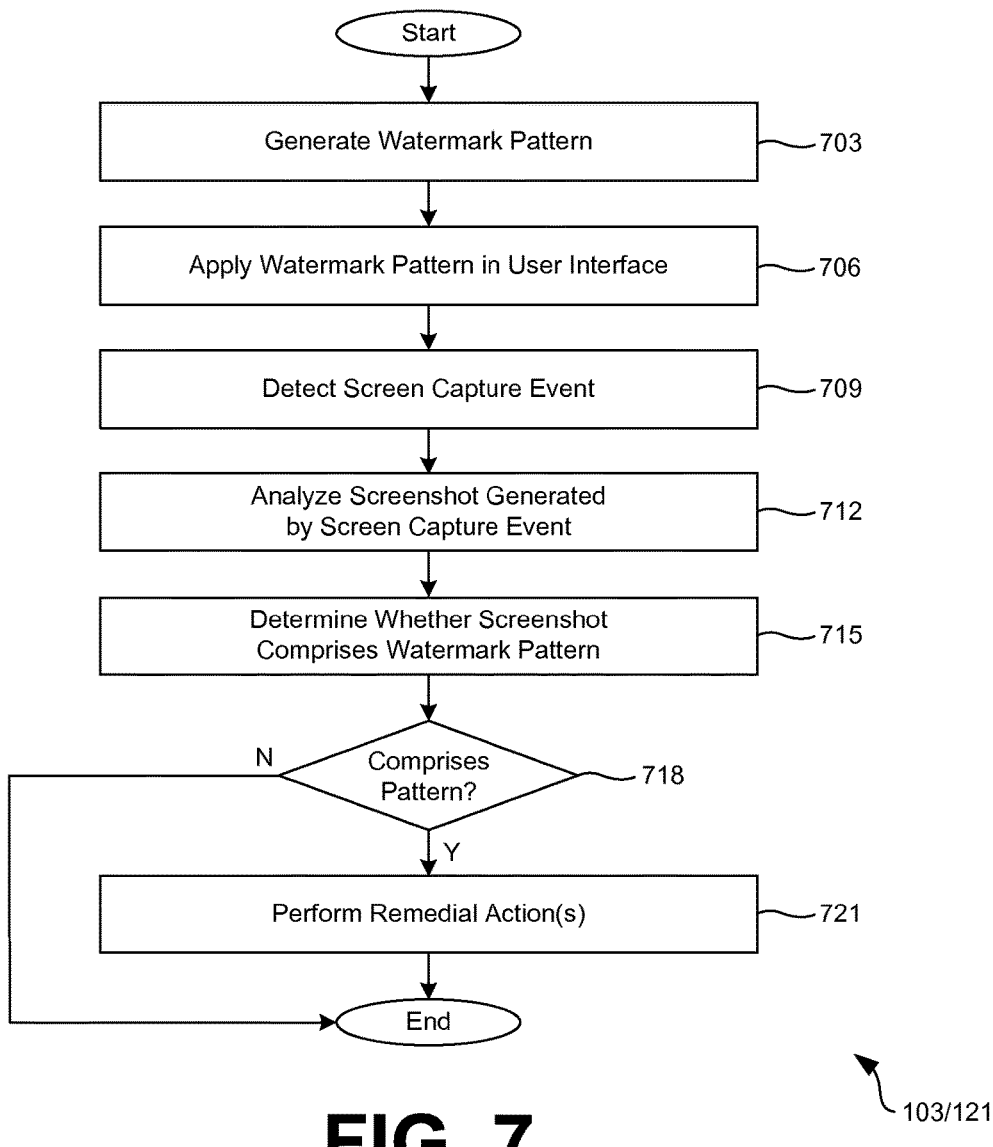
FIG. 7 is a flowchart illustrating an example of functionality implemented by components that can be executed in the networked environment of FIG. 1.

Referring next to FIG. 7, shown is a flowchart that provides one example of the operation of a portion of the networked environment 100. As an alternative, the flowchart of FIG. 7 can be viewed as depicting an example of steps of a method implemented by the computing environment 103 or the client application 121. The separation or segmentation of functionality as discussed herein is presented for illustrative purposes only.

Various types of client applications 121, operating systems, or services can be configured to detect screen capture events when they occur and analyze screenshots generated during the screen capture events to identify content shown in the screenshots. In some examples, a client application 121 being executed on the client device 106 when the screen capture event occurs can be identified. Further, the particular user interface screen of the client application 121 being shown when the screen capture event can be identified.

To identify the client application 121 or the user interface screen of the client application 121, in step 703, the client application 121 or the computing environment 103 can generate watermark pattern 124 for a user interface screen of a client application 121 and stored in association with an identifier of the user interface screen or the client application 121 in the data store 112. If the watermark pattern 124 is identified in a screenshot 120, the client application 121 or the computing environment 103 can cross-reference the watermark pattern 124 in the data store 112 to identify the particular client application 121 or user interface 133.

In some examples, a watermark pattern 124 includes an arrangement of pixels having values offset from a base pixel. For example, the client application 121 or the computing environment 103 can identify a base pixel at a suitable (x, y) location of a user interface 133. The client application 121 or the computing environment 103 can adjust values of pixels located at a predefined distance away from the base pixel as an offset from a value of the base pixel. For example, if a base pixel has an alpha value of 1, the client application 121 or the computing environment 103 can modify a pixel located two pixels away to have an alpha value of 3, where the offset from the base pixel is alpha+2. As the pixels in the watermark pattern 124 have values offset from a value of the base pixel, a conversion of the screenshot 120 to greyscale, colorblind mode, or high contrast will not prevent detection of the watermark pattern 124.

Further, generating the watermark pattern 124 can be performed to maintain the watermark pattern 124 despite image compression that can occur when generating a digital image file for a screenshot 120. The client application 121 or the computing environment 103 can identify a suitable location of the watermark pattern 124 to withstand compression, such as a header or a footer, and apply the watermark pattern 124 in the suitable location. The client application 121 or the computing environment 103 can further select the values of the pixels in the watermark pattern 124 as an offset from the base pixel. The client application 121 or the computing environment 103 can minimize the offset to make the watermark pattern 124 unnoticeable when shown near the base pixel and other surrounding pixels. In some examples, the computing environment 103 can remotely generate the watermark pattern 124 and store the watermark pattern 124 in the data store 112. In other examples, the client application 121 locally generates the watermark pattern 124 on the client device 106.

In step 706, the client application 121 or the computing environment 103 can apply the watermark pattern 124 to a user interface 133. In some examples, the watermark pattern 124 can include an image file overlaid in a respective location of the user interface 133. In other examples, the watermark pattern 124 can be encoded in a resource in the user interface 133, such as an image file. For example, an image of a header bar that is used as an asset in an application package file can be modified to include the watermark pattern 124.

In some examples, a first client application 121 can overlay a watermark on the user interface 133 of a second client application 121. For example, if a user executes an enterprise e-mail application and opens an attachment using a document viewer, a watermark may be placed on another layer on the user interface 133 to overlay the watermark on the document although the enterprise e-mail application has no control over the document viewer. As a result, screen captures of sensitive content that are not displayed directly in a proprietary application can be managed when content is accessed in third-party applications.

In another example, a user can select a hyperlink in a document or email to access a network resource, such as a uniform resource locator (URL), using a web browser application or other suitable application. A watermark can be placed on another layer on the user interface 133 to overlay the watermark in the web browser application although the application from which the hyperlink was selected has no control over the content being rendered in the display 136. A suitable watermark can be generated to overlay in the web browser application based on the network resource being accessed. For example, if the hyperlink selected by a user matches a predefined corporate intranet site, a watermark can be generated that conveys a high sensitivity level 127. In other examples, watermarks can be applied to user interfaces 133 of other third-party applications, such as a document viewer application when a document is accessed from an enterprise workspace, or a media player application when a corporate audio or video file is being played.

The sensitivity level 127 encoded in a watermark can be determined by the client application 121, and different watermarks can be used based on the sensitivity levels 127. For example, a first RGB pattern or alpha pattern can convey a low sensitivity level 127 while a second pattern can convey a medium sensitivity level, and a third pattern can convey a high sensitivity level 127, such as a confidential sensitivity level 127. The confidentiality level 127 can be based in part on the client application 121 that launched the currently displayed content. For example, an attachment to a calendar invite can be more likely to contain highly confidential material than the calendar invite itself. As a result, a watermark that conveys a low sensitivity level 127 can be rendered in a user interface 133 for the calendar invite while a watermark that conveys a high sensitivity level 127 can be rendered in a user interface 133 that displays content of an attachment of the calendar invite.

Depending on the user interface screen to be shown on the display 136 at a given time, the client application 121 can access a corresponding watermark pattern 124 from the data store 112 to apply to the user interface 133. In some examples, the watermark patterns 124 are included in the user interface 133 while being imperceptible to the human eye. For example, an arrangement of pixels in a header bar can be altered to slightly modify the color of pixels in an arrangement such that a user of the client device 106 would be incapable of visually detecting the presence of a watermark pattern 124. In another example, an arrangement of pixels in the user interface 133 can be altered to slightly modify the alpha value of pixels in an arrangement such that a user of the client device 106 would be incapable of visually detecting the presence of a watermark pattern 124. When the watermark pattern 124 is applied to the user interface 133, the screenshot analysis application 118 can identify the client application 121 or a user interface 133 of the client application 121 shown in the screenshot 120.

Next, in step 709, the client application 121 or the computing environment 103 can detect the performance of a screen capture event during which a digital image file of a screenshot 120 is generated. In one example, the client application 121 can monitor a file directory of the client device 106 where snapshots are traditionally stored to identify the presence of new digital images, indicating that a screen capture event has been performed. In another example, the client application 121 monitors user gestures or other interactions performed in association with the hardware or software components of the client device 106. For instance, some client devices 106 can be configured to perform a screen capture event as the user swipes his or her palm across the display 136. The client application 121 can detect the swipe gesture performed on the display, indicating that a screen capture event has been performed.

In step 712, the client application 121 or the computing environment 103 can analyze the screenshot 120. In one example, the client application 121 can locally analyze the screenshot 120 generated during the screen capture event. In another example, the client device 106 can communicate the screenshot 120 over the network 109 as screenshot data 142 for remote analyzation by the computing environment 103.

In step 715, the screenshot 120 is analyzed to determine whether the screenshot 120 includes a watermark pattern 124. In one example, the client application 121 can iterate through various screenshots 120 accessible by the client device 106 to analyze each screenshot 120 for the presence of one or more watermark patterns 124. The client application 121 or the computing environment 103 can access the screenshots 120 from a local directory, an application programming interface (API) offered by an operating system or screenshot service, a public or shared folder, a remote folder synced with the client device 106, a public or private cloud computing environment in communication with the client device 106, or from a network site or file directory.

As can be appreciated, a client device 106 can execute a client application 121 although a user interface 133 of the client application 121 is not shown on a display 136. For example, a first client application 121 can execute in a background mode of an operating system of the client device 106 while a second client application 121 executes in a foreground mode, where the user interface 133 of the second client application 121 is actually shown. Accordingly, even if a screen capture event is detected on the client device 106, the content of the screenshot 120 can include information that is not sensitive in nature. For example, a secure email application having sensitive emails can execute in a background mode while a calculator application is executing in a foreground mode. If a screenshot 120 is generated that shows a user interface 133 of the calculator application as opposed to the secure email application, the client application 121 can abstain from performing a remedial action 152 as the sensitive emails were not compromised.

Accordingly, in step 718, if a determination is made that the screenshot 120 does not include a watermark pattern 124, the process can proceed to completion where the computing environment 103 and the client application 121 abstain for performing a remedial action 152. Conversely, the client application 121 or the computing environment 103 can perform one or more remedial actions 152 in step 721 if a determination is made that the screenshot 120 includes a watermark pattern 124.

In some examples, the client application 121 or the computing environment 103 can identify a remedial action 152 based on a sensitivity level 127 defined for a client application 121 identified in the screenshot 120; a particular user interface 133 identified in the screenshot 120; text, keywords, or phrases identified in the screenshot 120; or images in the screenshot 120. In one example, a client application 121 can include an email application where a user can send and receive enterprise emails. A "help" screen, or a user interface 133 that assists a user with how to use the email application, can have a lower sensitivity level 127 than a user interface 133 that includes content of a confidential email. In another example, the client application 121 or the computing environment 103 can cross-reference text regions that include the term "important" against sensitivity levels 127 to determine that text regions that use the term "important" have a low sensitivity level 127. In yet another example, the client application 121 or the computing environment 103 can cross-reference text regions that include the terms "confidential" or "proprietary" against sensitivity levels 127 to determine that text regions that use the terms "confidential" or "proprietary" have a high sensitivity level 127.

In some embodiments, the remedial action 152 can include blurring or obfuscating potentially sensitive portions of the screenshot 120, deleting the screenshot 120 from local memory of the client device 106, communicating a notification to an administrator indicating that a screen capture event has been performed, overlaying a label or a watermark on the screenshot 120, or replacing content in the screenshot 120 with other predefined content, such as content that indicates that the screenshot 120 has been modified to remove sensitive content.

Figure 8:
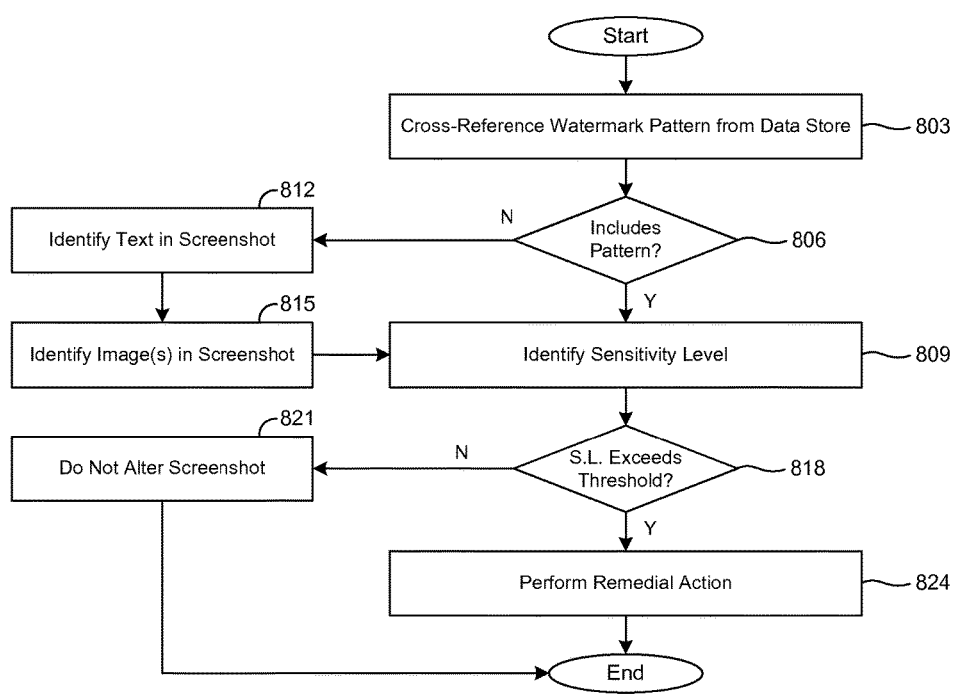
FIG. 8 is a flowchart illustrating an example of functionality implemented by components that can be executed in the networked environment of FIG. 1.

Turning now to FIG. 8, shown is a flowchart that provides one example of the operation of a portion of the networked environment 100. As an alternative, the flowchart of FIG. 8 can be viewed as depicting an example of steps of a method implemented by the computing environment 103 or the client application 121. The separation or segmentation of functionality as discussed herein is presented for illustrative purposes only.

In addition to performing a remedial action 152 based solely on the particular client application 121 or user interface 133 identified in the screenshot 120, the client application 121 can perform other analysis to determine whether the screenshot 120 includes sensitive content. For example, a "help" screen of a secure document management application may not include sensitive content while an "inbox" screen would include sensitive content. In some examples, a screenshot 120 captured of the "help" screen would not require deletion while a screenshot 120 captured of the "inbox" would require deletion, for example, based on sensitivity levels 127 associated with each of the user interfaces 133. Further, in some examples, the client application 121 can determine whether screenshots 120 generated by other client applications 121 include sensitive or proprietary content by analyzing the screenshots 120 to determine whether they include sensitive or proprietary content.

Starting with step 803, the client application 121 or the computing environment 103 can analyze a screenshot 120 to identify a watermark pattern 124 in the screenshot 120 and to cross-reference the watermark pattern 124 with the data store 112. Cross-referencing can include using characteristics of the watermark pattern 124 to query the data store 112 to identify a corresponding entry that can include an identifier for a client application 121 or an identifier for a particular user interface 133 of the client application 121.

The characteristics of the watermark pattern 124 can include, for example, pixel locations of red, green, blue, or alpha values.

In step 806, it is determined whether the screenshot 120 includes a watermark pattern 124 identified from the data store 112. If so, in step 809, the client application 121 or the computing environment 103 can identify a sensitivity level 127 based on the client application 121 or the user interface 133 of the client application 121 shown in the screenshot 120. The sensitivity levels 127 can indicate a sensitivity of a particular user interface 133, such as an "inbox" in a secure email application or a "confidential" folder in a secure document application. In some examples, an administrator can associate a high sensitivity level 127 with a client application 121 where all user interfaces 133 of the client application 121 inherit the high sensitivity level 127.

Referring back to step 806, if the watermark pattern 124 is not identified in the data store 112, the client application 121 or the computing environment 103 can further process the screenshot 120 to determine whether sensitive or propriety information is shown in the screenshot 120. For example, in step 812, the client application 121 or the computing environment 103 can analyze the screenshot 120 to identify text in the screenshot 120. This can include applying OCR techniques to identify regions of text in the screenshot 120 as well as individual characters. Further, in step 815, the client application 121 or the computing environment 103 can identify images, such as icons, symbols or graphics, in the screenshot 120.

Next, the process can proceed to 809 to determine whether a sensitivity level 127 has been established for the text or images identified in the screenshot 120. For example, the client application 121 or the computing environment 103 can identify a high sensitivity level 127 for a screenshot 120 if a term in a text region of the screenshot 120 includes "confidential" or "proprietary." However, the client application 121 or the computing environment 103 can identify a low sensitivity level 127 if the text region includes the term "important." If an image identified from the screenshot 120 includes characteristics indicating that the image is of a chemical formula, mathematical equation, or other potentially proprietary content, the client application 121 or the computing environment 103 can associate the image identified in the screenshot 120 with a high sensitivity level 127.

In step 818, it is determined whether the client application 121, the user interface 133 of the client application 121, the text in the screenshot 120, or the images identified in the screenshot 120 have a sensitivity level 127 exceeding a predefined threshold. An administrator can establish the predefined threshold as a threshold where a remedial action 152 should be performed. For example, if content in the screenshot 120 has a high sensitivity level 127, the client application 121 or the computing environment 103 can cause the screenshot 120 to be deleted or censored. If the sensitivity level 127 of the content identified in the screenshot 120 does not exceed a predefined threshold, the process can proceed to step 821 where the screenshot 120 is not altered. Thereafter, the process can end.

However, if the sensitivity level 127 of the content identified in the screenshot 120 exceeds a predefined threshold, in step 824, the client application 121 or the computing environment 103 can perform a remedial action 152. In some examples, the client application 121 or the computing environment 103 can identify a remedial action 152 based on a sensitivity level 127 of the particular client application 121, the user interface 133 captured in the screenshot 120, text in the user interface 133, or images in the user interface 133.

For example, the client application 121 or the computing environment 103 can blur or obfuscate regions of the screenshot 120 that have sensitive content. In other examples, the client application 121 or the computing environment 103 can delete the screenshot 120 and communicate an electronic notification to an administrator that indicates that a screen capture event has been performed. In some examples, the electronic notification can include information pertaining to the content identified in the screenshot 120. In some examples, the client application 121 or the computing environment 103 can overlay a label or a watermark on the screenshot 120. In yet other examples, the client application 121 or the computing environment 103 can replace content in the screenshot 120 with other predefined content, such as content that indicates that the screenshot 120 has been modified to remove sensitive content. For example, the client application 121 or the computing environment 103 can replace the subject lines of proprietary emails with "REMOVED," or other suitable label. Thereafter, the process can proceed to end.

Figure 9:
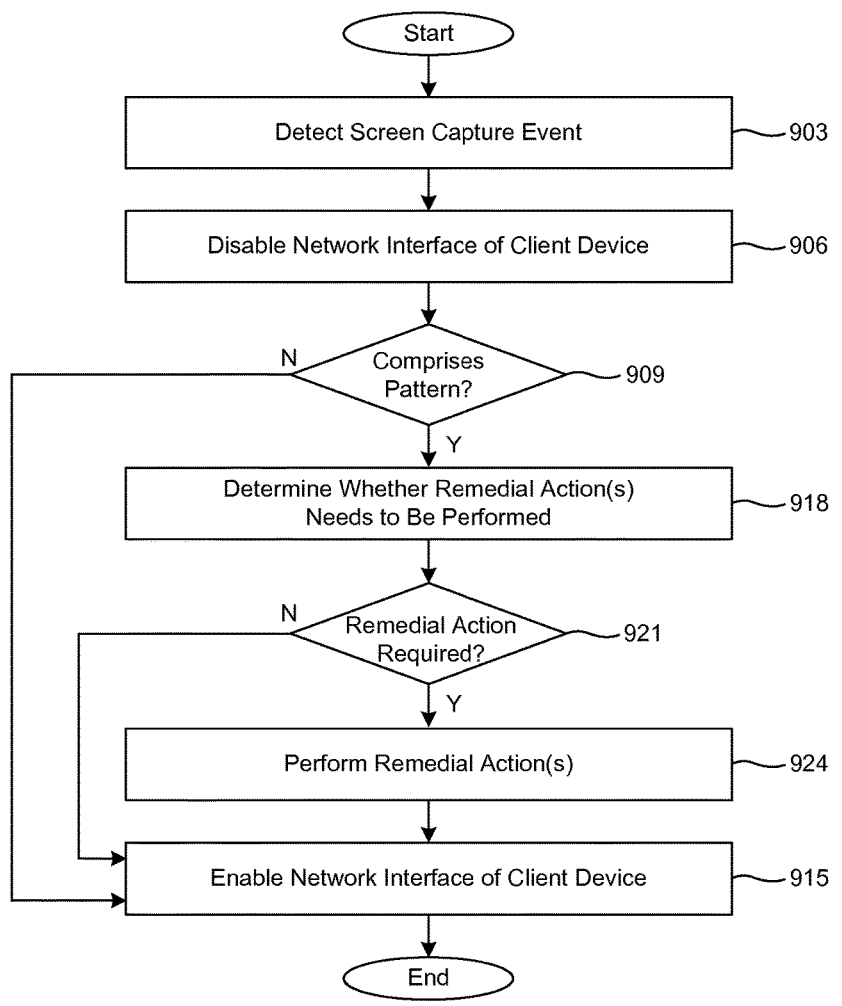
FIG. 9 is a flowchart illustrating an example of functionality implemented by components that can be executed in the networked environment of FIG. 1.

Moving on to FIG. 9, shown is a flowchart that provides one example of the operation of a portion of the networked environment 100. As an alternative, the flowchart of FIG. 9 can be viewed as depicting an example a method implemented by the computing environment 103 or the client application 121. The separation or segmentation of functionality as discussed herein is presented for illustrative purposes only.

In step 903, the client application 121 or the computing environment 103 can detect a screen capture event during which a digital image file of a screenshot 120 is generated. In one example, the client application 121 can monitor a file directory of the client device 106 where snapshots are traditionally stored to identify the presence of new digital images, indicating that a screen capture event has been performed. In another example, the client application 121 can monitor user gestures or other interactions performed in association with the hardware or software components of the client device 106. For instance, some client devices 106 can perform a screen capture event as the user swipes his or her palm across the display 136. The client application 121 can detect the swipe gesture performed on the display, indicating that a screen capture event has been performed.

In some situations, a client device 106 can perform a cloud backup of a digital image when the digital image is generated. For example, if a screen capture event is performed, the digital image of the screen capture can automatically be uploaded to cloud storage. Accordingly, in step 906, a network interface of the client device 106 can be disabled in response to detection of a screen capture event, for example, to prevent the digital image of the screenshot 120 being transferred to another device. In some examples, disabling of the network interface can include disabling a wireless fidelity (WiFi) module, disabling a cellular network module, such as a GSM or CDMA module, or disabling a wired communication network module, such as an Ethernet module, a Firewire module, or a universal serial bus (USB) module.

In step 909, the screenshot 120 is analyzed to determine whether the screenshot 120 includes a watermark pattern 124. In one example, the client application 121 can iterate through various screenshots 120 accessible by the client device 106 to analyze each screenshot 120 for the presence of one or more watermark patterns 124. The client application 121 or the computing environment 103 can access the screenshots 120 from a local directory, an application programming interface (API) offered by an operating system or screenshot service, a public or shared folder, a remote folder synced with the client device 106, a public or private cloud computing environment in communication with the client device 106, or from a network site or file directory.

Accordingly, if a determination is made that the screenshot 120 does not include a watermark pattern 124, the process can proceed to step 915 where the network interface disabled in step 906 is enabled and, the process can proceed to completion thereafter. Alternatively, in step 918, the client application 121 or the computing environment 103 can determine whether one or more remedial actions 152 needed to be performed in step 918 if a determination is made that the screenshot 120 includes a watermark pattern 124 at step 909.

In some examples, the client application 121 or the computing environment 103 can determine whether one or more remedial actions 152 are required based on a sensitivity level 127 conveyed by the identified watermark pattern. For example, a client application 121 can include an email application where a user can send and receive enterprise emails. A "help" screen, or a user interface 133 that assists a user with how to use the email application, can have a lower sensitivity level 127 than a user interface 133 that includes confidential or sensitive content. Accordingly, a remedial action 152 may not be required if the screenshot 120 includes the "help" screen. However, one or more remedial actions 152 may be required if the screenshot 120 includes the sensitive or confidential content.

In step 921, if a remedial action 152 is not required, the process can proceed to 915 to enable the network interface of the client device 106 and, thereafter, the process can proceed to completion. If a remedial action 152 is required, the process can proceed to step 924 where the remedial action 152 can be performed. In some embodiments, the remedial action 152 can include blurring or obfuscating potentially sensitive portions of the screenshot 120, deleting the screenshot 120 from local memory of the client device 106, communicating a notification to an administrator indicating that a screen capture event has been performed, overlaying a label or a watermark on the screenshot 120, or replacing content in the screenshot 120 with other predefined content, such as content that indicates that the screenshot 120 has been modified to remove sensitive content.

The process then proceeds to 915 to enable the network interface of the client device 106. In some examples, enabling of the network interface can include enabling the WiFi module, enabling the cellular network module, such as a GSM or CDMA module, or enabling a wired communication network module, such as an Ethernet module, a Firewire module, or a USB module. If a remedial action 152 performed in step 924 includes modifying the image of the screenshot 120, the modified screenshot 120 can be transmitted using the network interface. Thereafter, the process can proceed to completion.

The flowcharts of FIGS. 7, 8, and 9 show examples of the functionality and operation of implementations of components described herein. The components of the networked environment 100 described herein can be embodied in hardware, software, or a combination of hardware and software. If embodied in software, each step in the flowcharts of FIGS. 6 and 7 can represent a module or a portion of code that includes computer instructions to implement the specified logical functions. The computer instructions can be embodied in the form of source code that includes human-readable statements written in a programming language or machine code that includes machine instructions recognizable by a suitable execution system, such as a processor in a computer system or other system. If embodied in hardware, each step can represent a circuit or a number of interconnected circuits that implement the specified logical functions.

Although the flowcharts of FIGS. 7, 8, and 9 show a specific order of execution, it is understood that the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid. All such variations are within the scope of the present disclosure.

The computing environment 103, client device 106, and other components described herein can each include at least one processing circuit. Such a processing circuit can include one or more processors and one or more storage devices that are coupled to a local interface. The local interface can include a data bus with an accompanying address/control bus.

A storage device for a processing circuit can store data and components that are executable by the one or more processors of the processing circuit. In some examples, the device management application 115, the screenshot analysis application 118, and the client application 121 can be stored in one or more storage devices and be executable by one or more processors. Also, the data store 112 can be located in the one or more storage devices.

The device management application 115, the screenshot analysis application 118, the client application 121, and other components described herein can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, one or more microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software or computer instructions for use by or in connection with the instruction execution system.

A computer-readable medium can include a physical media, such as, magnetic, optical, semiconductor, or other suitable media. Examples of a suitable computer-readable media include solid-state drives, magnetic drives, flash memory, and storage discs, such as compact discs (CDs).

Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A non-transitory computer-readable medium embodying program instructions executable in a client device comprising at least one hardware processor that, when executed by the client device, cause the client device to:
   display, by a first client application executing on the client device, a watermark pattern in a portion of a user interface shown in a display of the client device, wherein the watermark pattern is displayed such that the watermark pattern is imperceptible to a user of the client device;
   after the watermark pattern is displayed, detect, by the first client application, that a screen capture event has been performed on the client device where a digital image file of a screenshot is generated;
   in response to the screen capture event being performed on the client device, send, by the first client application, the digital image file to a remote computing device, wherein the remote computing device is configured to:
      determine that the digital image file of the screenshot comprises the watermark pattern displayed by the first client application; and
      analyze the digital image file to determine that a user interface of a second client application is shown in the digital image file;
   receive, by the first client application, a response from the remote computing device that indicates that the digital image comprises the watermark pattern and the user interface of the second client application is shown in the digital image file; and
   in response to the digital image comprising the watermark pattern and the user interface of the second client application being shown in the digital image file, cause, by the first client application, performance of a remedial action in association with the digital image file.

2. The non-transitory computer-readable medium of claim 1, wherein the watermark pattern is identified in a region of the digital image file by identifying at least one pixel value for a pixel positioned a predefined distance away from a base pixel.

3. The non-transitory computer-readable medium of claim 2, wherein the at least one pixel value comprises at least one of: a red value, a green value, a blue value, or an alpha value.

4. The non-transitory computer-readable medium of claim 1, wherein the remedial action further comprises at least one of: blurring at least a portion of the digital image file; deleting the digital image file from memory; causing transmission of an electronic communication to an administrator; and replacing visual content in the digital image file with other predefined visual content that indicates that the digital image has been modified.

5. The non-transitory computer-readable medium of claim 4, wherein blurring the portion of the digital image further comprises:
   identifying the portion of the digital image that includes sensitive information; and
   blurring the portion of the digital image that includes the sensitive information.

6. The non-transitory computer-readable medium of claim 1, wherein the program instructions, when executed by the client device, are further configured to cause the client device to:
   identify at least one text region in the digital image file using optical character recognition (OCR);
   identify at least one term in the at least one text region;
   identify a sensitivity level associated with the at least one term; and
   in response to the sensitivity level associated with the at least one term exceeding a predefined threshold, cause the performance of the remedial action in association with the digital image file.

7. The non-transitory computer-readable medium of claim 1, wherein the watermark pattern displayed is selected by the first client application from a plurality of potential watermark patterns based at least in part on a sensitivity level determined from an analysis of content to be displayed simultaneously with the watermark pattern.

8. A computer-implemented method, comprising:
   displaying, by a first client application executing on a client device, a watermark pattern in a portion of a user interface shown in a display of the client device, wherein the watermark pattern is displayed such that the watermark pattern is human-imperceptible;
   after the watermark pattern is displayed, detecting, by the first client application, that a screen capture event has been performed on the client device where a digital image file of a screenshot is generated;
   in response to the screen capture event being performed on the client device, sending the digital image file to a remote computing device, wherein the remote computing device is configured to:
      determine that the digital image file of the screenshot comprises the watermark pattern displayed by the first client application; and
      analyze the digital image file to determine that a user interface of a second client application is shown in the digital image file;
   receiving, by the first client application, a response from the remote computing device that indicates that the digital image comprises the watermark pattern and the user interface of the second client application is shown in the digital image file; and
   in response to the digital image comprising the watermark pattern and the user interface of the second client application being shown in the digital image file, causing, by the first client application, performance of a remedial action in association with the digital image file.

9. The computer-implemented method of claim 8, wherein the watermark pattern is identified in a region of the digital image file by identifying at least one pixel value for a pixel positioned a predefined distance away from a base pixel.

10. The computer-implemented method of claim 9, wherein the at least one pixel value comprises at least one of: a red value, a green value, a blue value, or an alpha value.

11. The computer-implemented method of claim 8, wherein the remedial action further comprises at least one of: blurring at least a portion of the digital image file; deleting the digital image file from memory; causing transmission of an electronic communication to an administrator; and replacing visual content in the digital image file with other predefined visual content that indicates that the digital image has been modified.

12. The computer-implemented method of claim 8, further comprising:
identifying a region of the digital image file that comprises sensitive information; and
modifying the digital image file to make the region of the digital image file that comprises the sensitive information illegible.

13. The computer-implemented method of claim 8, further comprising:
identifying at least one image in the digital image file;
identifying a sensitivity level associated with the at least one image; and
in response to the sensitivity level associated with the at least one image exceeding a predefined threshold, causing the performance of the remedial action in association with the digital image file.

14. The computer-implemented method of claim 8, wherein the watermark pattern displayed is selected by the first client application from a plurality of potential watermark patterns based at least in part on a sensitivity level determined from an analysis of content to be displayed simultaneously with the watermark pattern.

15. A system, comprising:
a client device comprising a data store and at least one hardware processor;
program instructions stored in the data store that, when executed by the client device, cause the client device to:
display, by a first client application executing on the client device, a watermark pattern in a portion of a user interface shown in a display of the client device, wherein the watermark pattern is displayed such that the watermark pattern is imperceptible to a user of the client device;
after the watermark pattern is displayed, detect, by the first client application, that a screen capture event has been performed on the client device where a digital image file of a screenshot is generated;
in response to the screen capture event being performed on the client device, send, by the first client application, the digital image file to a remote computing device, wherein the remote computing device is configured to:
determine that the digital image file of the screenshot comprises the watermark pattern; and
analyze the digital image file to determine that a user interface of a second client application is shown in the digital image file;
receive, by the first client application, a response from the remote computing device that indicates that the digital image comprises the watermark pattern and the user interface of the second client application is shown in the digital image file; and
in response to the digital image comprising the watermark pattern and the user interface of the second client application being shown in the digital image file, cause, by the first client application, performance of a remedial action in association with the digital image file.

16. The system of claim 15, wherein the watermark pattern is identified in a region of the digital image file by identifying at least one pixel value for a pixel positioned a predefined distance away from a base pixel.

17. The system of claim 16, wherein the at least one pixel value comprises at least one of: a red value, a green value, a blue value, or an alpha value.

18. The system of claim 15, wherein the remedial action further comprises at least one of: blurring at least a portion of the digital image file; deleting the digital image file from memory; causing transmission of an electronic communication to an administrator of the first client application; and replacing visual content in the digital image file with other predefined visual content that indicates that the digital image has been modified.

19. The system of claim 15, further comprising program code instructions that, when executed by the client device, cause the client device to:
identify a region of the digital image file that comprises sensitive information; and
identify the digital image file to make the region of the digital image file that comprises the sensitive information illegible.

20. The system of claim 15, wherein the watermark pattern displayed is selected by the first client application from a plurality of potential watermark patterns based at least in part on a sensitivity level determined from an analysis of content to be displayed simultaneously with the watermark pattern.

* * * * *